United States Patent [19]

Beaver et al.

[11] Patent Number: 5,326,058
[45] Date of Patent: Jul. 5, 1994

[54] MONITOR MOUNTING PLATE FOR VIDEO EQUIPMENT

[75] Inventors: Charles C. Beaver; Terry L. Biship; James E. Rose, all of Bay City, Mich.

[73] Assignee: Avalon Video, Inc., Bay City, Mich.

[21] Appl. No.: 75,620

[22] Filed: Jun. 14, 1993

[51] Int. Cl.$^5$ ............................................. F16M 11/04
[52] U.S. Cl. ...................................... 248/187; 248/177; 352/243; 354/294
[58] Field of Search ............... 248/187, 177, 176, 179; 354/293, 82, 81, 294, 295; 352/243; 358/229

[56] References Cited

U.S. PATENT DOCUMENTS

| | | | |
|---|---|---|---|
| 812,233 | 2/1906 | Rock | 248/187 |
| 2,551,753 | 5/1951 | McClullough | |
| 2,589,892 | 3/1952 | Suzukawa | |
| 4,081,814 | 3/1978 | Bulland | 354/82 |
| 4,525,052 | 6/1984 | Kosugi | 248/187 X |
| 4,570,887 | 2/1986 | Banister | 248/187 |
| 4,752,794 | 6/1988 | Bohannon | 354/81 |
| 4,763,151 | 8/1988 | Klinger | 248/179 X |
| 5,031,872 | 7/1991 | Vance | 248/187 |
| 5,056,745 | 10/1991 | Gelbard | 352/243 X |
| 5,081,478 | 1/1992 | Hayashida | 352/243 X |
| 5,121,147 | 6/1992 | Wada | 354/81 |

FOREIGN PATENT DOCUMENTS

| | | | |
|---|---|---|---|
| 1036041 | 1/1955 | Fed. Rep. of Germany | 354/293 |
| 515526 | 12/1939 | United Kingdom | 354/293 |

*Primary Examiner*—J. Franklin Foss
*Attorney, Agent, or Firm*—Robert L. McKellar

[57] ABSTRACT

This invention deals with a new and novel plate for rigidly mounting a video monitor on video equipment such that the monitor moves commensurately with the video equipment. The configuration of the plate allows it to have a universal fit with almost any tripod/camera combination.

2 Claims, 1 Drawing Sheet

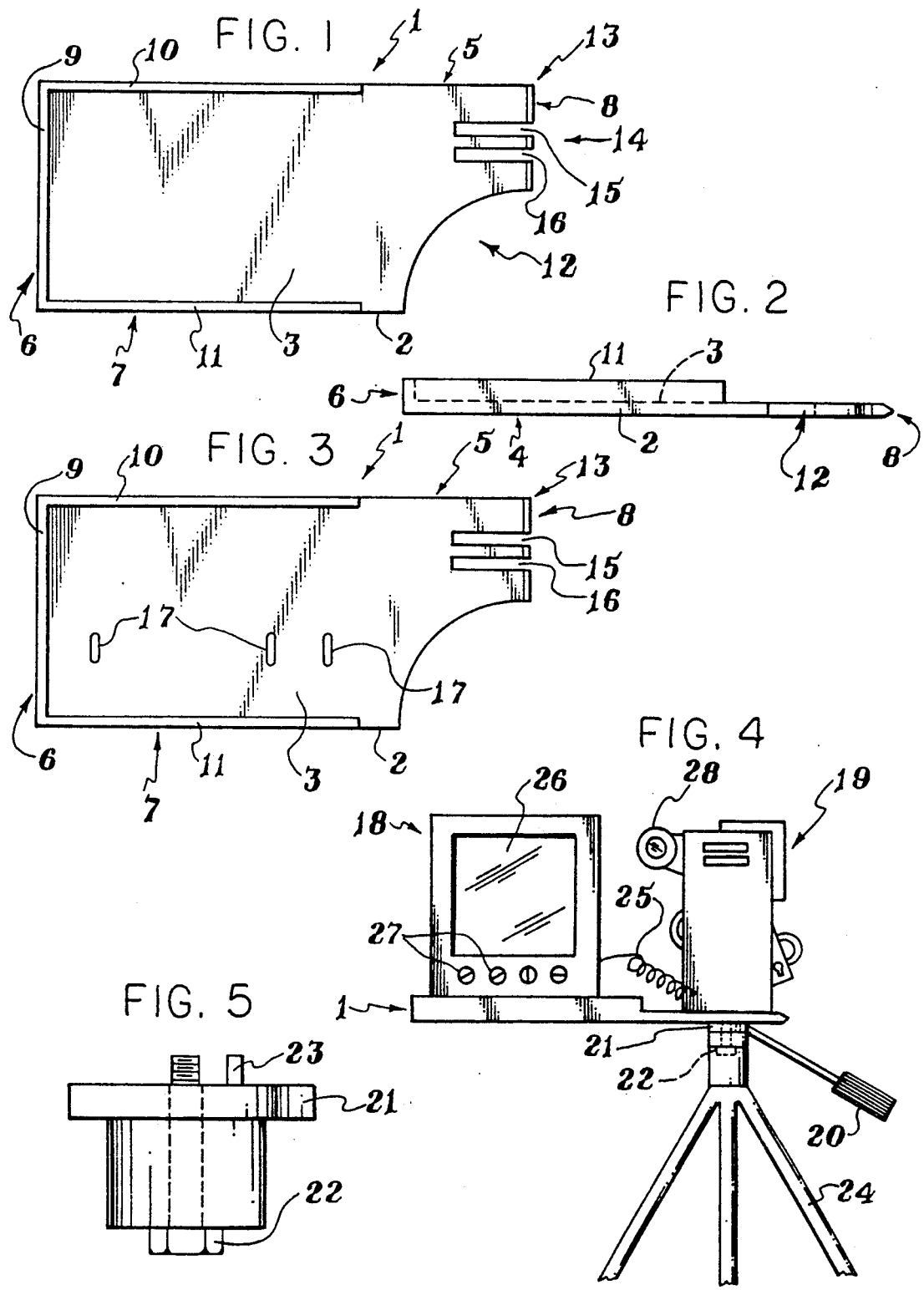

MONITOR MOUNTING PLATE FOR VIDEO EQUIPMENT

BACKGROUND OF THE INVENTION

This invention deals with a new and novel device for rigidly mounting a video monitor on video equipment such that the monitor moves commensurately with the video equipment.

The device is a single flat member having a rectangular configuration which contains two slots through its edges to allow its insertion between a camera and/or an adapter quick disconnect or tripod mounting plate. One slot in the plate passes along both sides of, and contains the mounting bolt of the camera, while the second slot passes along both sides and contains a post. The post prevents the movement of the plate in a circular motion around the mounting bolt of the camera.

One of the unique features of the plate is the way that the plate is configured with the grooves and the arcuate notch which provides for a universal fit of the plate on any tripod and camera combination on the market.

PRIOR ART

Devices for mounting are many and various and are designed to perform a single function. Such a device, for example, is the camera holder disclosed in U.S. Pat. No. 2,589,892, issued on Mar. 18, 1952 to Suzukawa, in which there is described a supporting holder for a camera that allows the supporting vertical line of a tripod to pass through the consolidated center of gravity, or a point adjacent thereto, of a camera having attached thereto a telephoto lens and a flash, in order to support the assembly in a stable state. This device has the single function of holding a camera, and its configuration will not allow for the holding or supporting of any other sort of equipment.

In U.S. Pat. 2,551,753, issued May 8, 1951 to McCullough, there is disclosed a photographic lighting bank and a means of supporting such a bank. This device comprises an elongated central supporting member, such as a tube, having any convenient mounting means for rigid attachment to the camera. This particular device comprises a plate fastened to the tube by rivets and, near its projecting end, the plate has a hole for cooperation with a camera securing means such as a machine screw normally carried by a tripod head. The plate is clamped between the camera and the tripod head by inserting the screw into the hold provided, and tightening the screw until there is sufficient frictional engagement between all the abutting surfaces to constitute a rigid connection. This device therefore, is rigidly fixed in position and does not rotate or otherwise move with the camera when the camera is moved and aimed. Thus, it is not seen where the devices described above would solve the problems that the device of the instant invention has sought to do.

THE INVENTION

The device of the instant invention is new and novel and allows one skilled in the art of video recording to move a monitor commensurately with the movement of a video camera.

The device of this invention is especially useable when video recording sports events in which the video camera must keep up with the action. It has been a major problem with using the viewfinder of the camera to track sports events in that the viewfinder does not have a broad enough field of view to allow one operating the camera to anticipate certain parts of the sports action. When the operator has his eye to the viewfinder, his entire field of vision is restricted to just a small view. However, if a video monitor is electrically attached to the video camera, the operator has a larger screen to view and can track the action more easily. In addition, as the inventors herein have discovered, if the video monitor can move commensurately with the video camera, then whatever the operator can not only quickly view via the video monitor what the camera is viewing, but the operator can scan about with the naked eye and view parts of the action that the camera is not currently concentrating on and the camera and the camera view can be quickly focused on the important action scenes of the event. In other words, if the operator can easily view what the camera views, and can in addition view the panoramic scene of the event with the naked eye, then the operator can quickly size up and anticipate where the camera should be aimed to get the best coverage of the sporting event. Using just the camera viewfinder does not allow for this panoramic view of the scene and hence, one cannot anticipate the action.

Thus, in one aspect, this invention deals with a monitor mounting plate for video equipment wherein the plate comprises a single flat member of essentially rectangular configuration having a top surface, a bottom surface, one full long side, one full short side, one partial long side, and one partial short side, all having outer edges. The plate has an upwardly directed lip along the full short side, an upwardly directed lip along the majority of the full long side, an upwardly directed lip along the majority of the partial long side, and no upwardly directed lip along the whole of the partial short side such that the three upwardly directed lips combine to form a rigidly attached short rail along a substantial portion of the outer edge of the top surface of the plate. The plate has an elliptical notch formed in a corner not having a rail thereon. The remaining corner not having a rail thereon is formed in a tongued configuration. The plate has two slots through it which are adjacent and parallel to each other and are open through the outside edge of the partial short side of the plate.

BRIEF DESCRIPTION OF THE DRAWINGS

FIG. 1 is a full top view of the plate.

FIG. 2 is a full side view of the plate.

FIG. 3 is a full top view of a different embodiment of the plate showing several openings through the plate to enable one to employ straps to hold the video monitor onto the tray.

FIG. 4 shows the combination of the video camera, a plate of this invention and the video monitor mounted on the plate along with a tripod which does not form part of the invention.

FIG. 5 is an enlarged full side view of the mounting system of the tripod showing the bolt and peg.

DETAILED DESCRIPTION OF THE DRAWINGS

There is shown in FIG. 1, a full top view of a monitor mounting plate 1 of this invention. There is shown a single flat member 2 of essentially rectangular configuration with one corner missing which will be discussed infra. There is a top surface 3, a bottom surface 4 (not shown) opposite the top surface 3, a full long side 5, a full short side 6, a partial long side 7, and a partial short side 8. The plate 1 has an upwardly directed lip 9 along the full short side 6, an upwardly directed lip 10 along the majority of the full long side 5, an upwardly directed lip 11 along the majority of the partial long side, and no upwardly directed lip along the whole of the partial short side 8. These upwardly directed lips, combine to form a short rail around the perimeter of the plate, and on the top surface 3 and are rigidly affixed to the top surface 3 of the plate 1. It is contemplated by the inventors herein that the plate can be formed out of light aluminum or plastic and therefore, it is contemplated that this rail will be formed integrally with the plate by extrusion or otherwise, rather than having the rails affixed separately to the top surface 3. It should be noted that the short rail does not cover the entire side 5, nor does it cover the entire side 7. The purpose of the short rail is to contain the video monitor 18 (see FIG. 4) on the surface 3 of the plate 1. The video monitor 18 is usually securely fastened to the plate 1, but it is contemplated within the scope of this invention to allow the video monitor 18 to just sit on the top surface 3 without it being secured. This mode of operation is used when the operator wishes to adjust the direction of the video monitor 18 away from its normal position.

The plate 1 has an arcuate notch 12 in one corner of the plate. This notch 12 can be in either of the corners not having the short rail. The purpose of the notch 12 is to ensure that the plate 1 does not interfere with the shoulder strap attachment bracket on the bottom of the video camera.

When the plate 1 has a notch 12 in one corner, then the opposite corner 13 of the partial short side 8 appears as a flat tongued configuration 14. The tongued configuration 14 has two slots 15 and 16 in it. These slots 15 and 16 extend through the outside edge of the partial short side 8 and are parallel and adjacent to each other. Thus, when the plate 1 is mounted on a tripod mounting plate 21 (FIG. 4) or the like, the securing bolt 22 of the tripod mounting plate 21 slides into slot 16 while a peg 23 slides into slot 15. When the tripod mounting plate 21 is tightened, the video camera 19, the plate 1, and the tripod 24 are securely fastened together. It should be noted that the plate 1 is mounted on the upper side of the tripod mounting plate 21 so that the video camera 19, the plate 1, and the video monitor 18 will move in a circular motion about a vertical axis of the tripod 24, but will do so commensurately.

FIG. 3 is a full top view of another embodiment of this invention in which there is shown openings 17 which are used in this invention to hold straps (not shown) which can be used to strap down the video monitor 18. Also contemplated within the scope of this invention is the situation in which the video monitor can be held in place by gluing it to the plate 1, or it can be clamped to the plate 1, or any such manner of securing the video monitor 18 can be used.

With reference to FIG. 4, it can be observed that the inventive combination is shown therein in which there is shown a plate 1 of this invention which is surmounted by a video monitor 18 (the lower most bottom shown in phantom). There is further shown a video camera 19 mounted on a tripod 24 by the use of a tripod mounting support 21 which is shown in further detail in FIG. 5.

The tripod mounting support 21 has mounted between its top and the bottom of the video camera 19, the plate 1 of this invention. The tripod mounting support 21 is designed such that it can revolve in a circular motion about a vertical axis through the tripod 24, while still securely holding the plate 1 and the video camera 19 together such that they move commensurately. So the combination can be totally understood, there is also shown a cord 25 to electrically connect the video monitor 18 to the video camera 19. Also shown is the screen 26 of the video monitor 18, the control knobs 27, the viewfinder 28 of the video camera 19, and with reference to FIG. 5, one can observe the bolt 22 and the peg 23 of the tripod mounting support 21, in full view.

We claim:

1. A monitor mounting plate for video equipment said plate comprising a single flat member of essentially rectangular configuration having a top surface, a bottom surface, one full long side, one full short side, one partial long side, and one partial short side, all having outer edges;

said plate having an upwardly directed lip along the full short side, an upwardly directed lip along the majority of the full long side, an upwardly directed lip along the majority of the partial long side, and no upwardly directed lip along the whole of the partial short side such that the three upwardly directed lips combine to form a rigidly attached short rail along a substantial portion of the outer edge of the top surface of the plate, said plate having an arcuate notch formed in a corner not having a rail thereon such that the remaining corner not having a rail thereon is formed in a tongued configuration;

said plate having two slots therethrough which are adjacent and parallel to each other and are open through the outside edge of the partial short side of the plate.

2. In combination, a video camera;

a plate as claimed in claim 1 affixed to and movable commensurately with the video camera;

a video monitor, electrically connected to the video camera, and mounted on said plate.

* * * * *